Jan. 18, 1966      J. BARTHOLOMÄ      3,230,537

FEED HORN WITH BROAD-BAND COMPENSATED POLARIZATION CHANGER

Filed May 18, 1960      2 Sheets-Sheet 1

INVENTOR
Johann Bartholomä

BY *George B. Spencer*

ATTORNEY

United States Patent Office 3,230,537
Patented Jan. 18, 1966

3,230,537
FEED HORN WITH BROAD-BAND COMPENSATED POLARIZATION CHANGER
Johann Bartholomä, Ulm (Danube), Germany, assignor to Telefunken Aktiengesellschaft
Filed May 18, 1960, Ser. No. 29,855
Claims priority, application Germany, May 22, 1959, T 16,725
2 Claims. (Cl. 343—756)

The present invention relates to a polarization balancing system for high frequency transmission systems, transmitting waves which are circularly or elliptically, i.e., rotationally, polarized.

Radar devices are frequently operated with circularly or elliptically polarized waves. Such waves do not produce a rain echo or a correspondingly undesired general brightness increase on the radar screen. This is so because the direction of rotation of circularly or elliptically polarized waves is reversed when the waves are reflected by the almost spherical raindrops. The circularly or elliptically polarized waves are changed in the receiver into linearly polarized waves. These waves have a direction of polarization perpendicular to the direction of polarization of the linearly polarized waves, out of which the circularly or elliptically polarized waves were produced by the transmitter. If such waves are reflected by an irregularly shaped object as, for example, an airplane, the polarization is changed differently, as compared with the change produced by raindrops. This polarization, due to the reflection by an irregularly shaped object, is such that the reflected waves, after being again changed in the receiver into linearly polarized waves of one direction only, will always include components having the same direction of linear polarization as the one produced in the transmitter before the transmitted waves were changed into circularly or elliptically polarized waves. As stated above, such component is not present whenever the waves are reflected by raindrops. Thus, if the component oscillating perpendicularly to the wave produced in the transmitter is filtered out from the reconverted linearly polarized wave in the receiver, the rain echo will be suppressed and a clear picture of the desired target will be obtained.

A circularly polarized wave can be considered as consisting of two components of linearly polarized waves oscillating, with a 90° phase shift, in directions perpendicular to each other. In case of an elliptical polarization, the directions of the components are still the same, but the phase shift amounts to more or less than 90°. The transmission of circularly or elliptically polarized waves within a high frequency transmission system is not simple, because curved wave guides and other circuit elements which must be incorporated in the system produce phase shifts between the two components.

An irregular phase shift is also produced in a horn antenna having an aperture other than of square or circular configuration. Such phase shift between the two linearly polarized components causes a polarization distortion. For example, a circularly polarized wave may be changed into an elliptically polarized wave, or an elliptically polarized wave may be changed into another elliptically polarized wave having a different ratio of the axes, these axes having directions differing from the directions of the axes of the initial wave. Furthermore, these phase shifts of the components of the circularly or elliptically polarized wave produced by and in the several transmission elements are dependent upon the frequency. It has been sought to remedy the undesired effects of such frequency dependent phase shifts of the two components by providing a very short transmission path for the circularly polarized wave, without curved wave guides, which path is made up of transmission elements of square or circular cross section. In radar apparatus having a reflection antenna and an exciter horn, the latter was provided with a square aperture, and the polarization changer producing the circularly polarized wave from a linearly polarized wave was mounted directly at the input of the horn. However, such polarization changer is a very heavy element, particularly if adjustment and tuning means are provided for changing the polarization as produced therein into an elliptical one.

Due to this heaviness, the support carrier of this polarization changer and the horn has to have considerable strength and is much bulkier than the support carrier for a horn transmitting only linearly polarized waves. Furthermore the weight distribution becomes unfavorable when the bulky and heavy polarization changer is mounted at the exciter horn, because a considerable load is then mounted at a substantial distance from the axis of rotation of the entire antenna arrangement.

It is, therefore, an object of the present invention to provide a high frequency transmission system which overcomes the deficiencies outlined above.

It is another object of the present invention to provide a polarization balancing element to be inserted in the wave guide system interconnecting a radar transmitter and an exciter horn antenna.

With the above objects in view, the present invention resides mainly in a high frequency transmission system in which a wave guide is inserted between an element feeding a predetermined circularly or elliptically polarized wave and a transmission system disturbing the polarization pattern of this wave, said wave guide having a cross section and length such as to balance the distortion produced by the transmission system.

Additional objects and advantages of the present invention will become apparent upon consideration of the following description when taken in conjunction with the accompanying drawing, in which.

Figure 1:
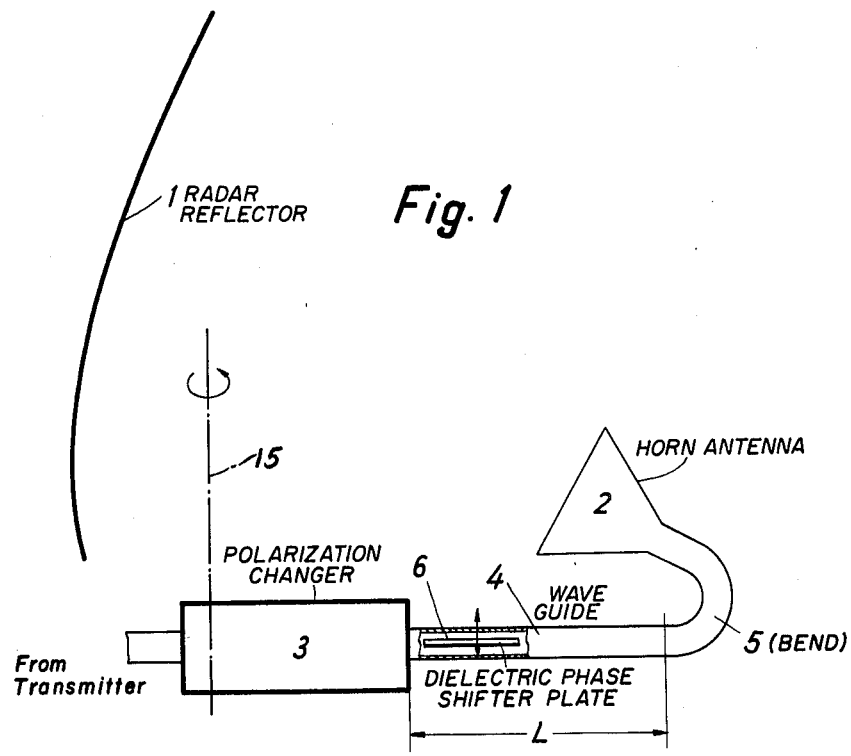
FIGURE 1 is a schematic side view and partial cross section of a radar antenna using the principle of the present invention.

FIGURE 1 shows, in diagrammatic cross section, a radar reflector 1 mounted for rotation about an axis 15. The structure of this rotatable reflector is conventional and is omitted for the sake of clarity. A horn antenna 2 for exciting the reflector 1 is mounted for rotation with the reflector. A polarization changer 3 is positioned near the axis of rotation 15 and is connected electrically as well as structurally to the horn via elements 4 and 5. Element 4 is a wave guide connecting the output of polarization changer 3 to a wave direction changer 5 which, in turn, feeds horn 2. The input of the polarization changer 3 is connected to a transmitter (not shown) producing linearly polarized waves. Changer 3 changes these waves into circularly or elliptically polarized waves which are then fed into wave guide 4. Elements 3, 4, 5 and 2 are interconnected electrically as well as structurally and rotate as a unit about axis 15. A phase shifter 6 is positioned in the wave guide 4 and is movable in the directions of the double arrow.

Figure 2A:
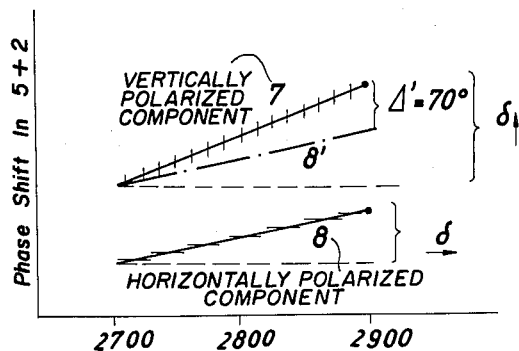
FIGURES 2a, 2b and 2c are graphs illustrating the phase shift as a function of frequency, as produced by the various elements shown in FIGURE 1.

The present invention relates primarily to the inserted wave guide 4. Without this wave guide 4, the arrangement would not operate properly because a phase shift between the two linearly polarized components of the circularly or elliptically polarized wave is produced in the direction changer 5 and in the horn 2. The horn 2, usually, has a rectangular aperture, as a result of which configuration this phase shift is increased. The usual frequency range of operation of this device is 2,700 to 2,900 megacycles/second, and the maximum phase shift between the two components of a rotationally polarized wave produced in elements 2 and 5 may be as high as 70°. The phase shift varies with the frequency. Thus, the horn 2 would radiate very differently polarized waves than as intended and produced by changer 3 if the wave guide 4 between the polarization changer 3 and the direction changer 5 were omitted. The absolute and relative phase shift produced by elements 2 and 5 is shown in the plots of FIGURE 2a.

In order to facilitate the understanding of the following description, the terminology set forth hereinafter will be used:

(a) "Phase shift" or "absolute phase shift" refers to the amount of phase shift produced by a particular element.

(b) "Total phase shift" of the components, without further qualification, means the absolute phase shift of the horizontally polarized component and/or of the vertically polarized component, as produced by all elements before the wave appears at the aperture of horn 2.

(c) "Relative phase shift" is the phase shift measured between the two components. In general, the expression "relative phase shift" does not include the inherent difference in phase with which the two components leave the polarization changer 3.

(d) "Phase shift between the two components as produced by element $x$" will mean the phase angle $|\varphi\uparrow - \varphi\rightarrow|$ with $\varphi\uparrow$ being the phase shift exerted only by element $x$ on the vertically polarized component $\varphi\rightarrow$ being the phase shift as exerted only by element $x$ on the horizontally polarized component.

(e) "Incremental phase shift" is the difference in phase shift produced either by all elements or, if so stated, by one or more particular elements, for only one component taken on two limit frequencies of a given range.

Referring again to FIGURE 2a, line 7 denotes the absolute phase shift of the vertically polarized component at various frequencies produced by elements 5 and 2 between the input of the former and the output of the latter. Line 8 denotes the corresponding phase shift of the horizontally polarized component. The maximum relative increase in phase shift in this range of frequencies from 2,700 to 2,900 megacycles/second is denoted by $\delta$, the subscript arrows indicating the direction of polarization. In the following, these $\delta$ values will be called incremental phase shift. If a phase shifting element affecting only one component, for example, the horizontally polarized one were used, the line 8 could be shifted to 8'. However, lines 8 and 8', on the one hand, and line 7, on the other hand, have different inclinations or, in other words, $\delta\uparrow$ is different from $\delta\rightarrow$. Thus, even if the relative phase shift between the two components were made zero at a frequency of 2,700 megacycles/second, there still would be a relative phase shift of $\delta\rightarrow - \delta\uparrow = \Delta' = 70°$ between those components at 2,900 megacycles/second and smaller values at frequencies between 2,700 and 2,900 megacycles/second. FIGURE 2a, thus, illustrates three different effects produced by elements 5 and 2 on the horizontally and the vertically polarized components:

(1) Every component is generally subjected to an absolute phase shift which varies with frequency.

(2) The frequency dependencies of these phase shifts are themselves different from each other, i.e., the lines representing the absolute phase shifts have different inclinations.

(3) The two lines lie one above the other.

From the above, it is clear that the polarization pattern of a circularly or elliptically polarized wave of a given frequency is not changed or distorted if both horizontally and vertically polarized components are phase shifted by the same angle, even if this angle depends on frequency. Thus, the fact that there is any phase shift at all is not in itself troublesome, because this does not change the phase difference, for example, 90°, between the two components which leave polarization changer 3. Point (1) above need not be compensated for completely if the phase shift between the two components is, or is made to be, exactly the same throughout the entire frequency range of interest, which means, that there be no relative phase shift between the two components. The present invention, thus, is primarily concerned with the above-mentioned points (2) and (3), namely, with the equalization of the phase shift exerted on the two components. The arrangement according to the present invention equalizes the slope of the phase shift-frequency. In addition, means, such as the dielectric plate 6, can be provided for making these curves coincide with each other. In other words, the increments $\delta\rightarrow$ and $\delta\uparrow$ of the entire system made up of elements 4, 5 and 2 are first made equal by special design of element 4, and the absolute values of the frequency shifts of the two components are also equalized. The relative phase shift between the two components in the entire transmission system comprising elements 4, 5 and 2 is made constant with respect to frequency and, as will be explained below, this constant may be reduced to zero by means of the element 6.

Figure 2B:
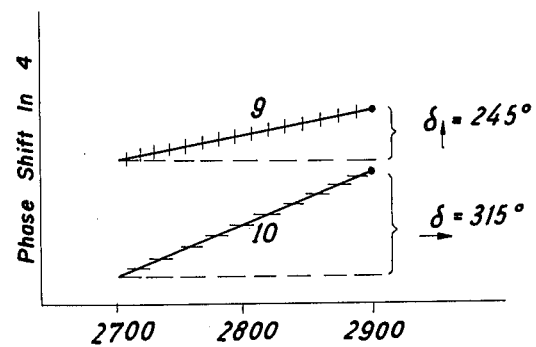
Figure 2C:
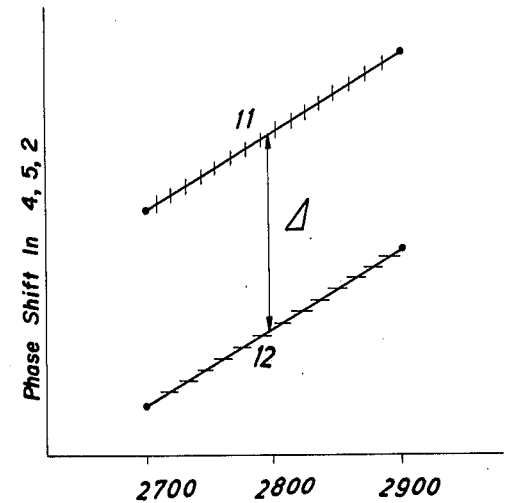

The wave guide 4 produces these balancing effects with the aid of the phase shifter 6. This wave guide 4 has a rectangular cross section and a length L sufficient to balance the frequency dependency of the phase shift between the two polarization components as produced by elements 5 and 2. In FIGURE 2b, line 9 illustrates the absolute phase shift of the vertically polarized component, and line 10 the phase shift of the horizontally polarized component, as effected by wave guide 4 and without the dielectric plate 6. The total phase shift caused by elements 4, 5 and 2 is obtained by adding the absolute phase shifts caused in each one of these elements and, thus, amounts to an addition of the lines of FIGURE 2a and FIGURE 2b, this addition being, of course, carried out separately for the two differently polarized components. This total phase shift is illustrated in FIGURE 2c, wherein line 11 was obtained by adding lines 8 and 10 of FIGURE 2a and FIGURE 2b, respectively. As can be seen from FIGURE 2c, the relative phase shift $\Delta$ between the two differently polarized components is constant throughout the entire frequency range of interest. This phase shift between the horizontally and the vertically polarized components appears at the output of elements 4, 5 and 2, which is the aperture of horn 2. The fact that there still is produced a phase shift between these two components could be compensated for by proper adjustment in polarization changer 3. For example, if a circularly polarized wave is to be produced at the aperture of horn 2, the polarization changer 3 has to produce an elliptically polarized wave, whereby the two components have a phase difference of $90° - \Delta$. This is to be changed by the elements 4, 5 and 2 into a circularly polarized wave without further distortion in causing this constant phase shift $\Delta$ between the two components after which, there remains only the desired phase difference of 90° between the components.

Alternatively, a phase shifting element can be inserted into the wave guide 4 which element, for example, may be the dielectric plate 6. This plate acts upon only one component and, thus, produces a constant phase shift for such component. The plate 6 is so proportioned as to reduce the relative phase shift $\Delta$ to zero, whereby the lines 11 and 12 would coincide. For fine tuning, the dielectric plate extends primarily in horizontal direction and is mounted so as to be shiftable in vertical directon.

Thus, ths plate acts on the electric vector of only the horizontally polarized component.

According to FIGURE 2c, the absolute phase shifts of the horizontally and vertically polarized components are similar but dependent upon frequency; in other words, lines 11 and 12 are not horizontal lines. However, this frequency dependent phase shift has no distorting effect on the polarization of a wave of a given frequency in the range illustrated. The band width actually used, for example, is only about 2 megacycles. This is very small as compared with the plotted operating frequency range extending from 2,700 megacycles/second to 2,900 megacycles/second, which is one hundred times the band width actually used in any specific case of operation. Thus, within the used band width of 2 megacycles, the difference in phase shift amounts to less than a few degrees. The operating transmitter frequency of the radar device can be adjusted to any point in the range between 2,700 and 2,900 megacycles/second, and there will be no distorting influence of the elements 2 and 5, due to the balancing action of the wave guide 4 acting within the entire possible adjustment range.

In the following, the critical proportions of the wave guide 4 will be calculated for an actual embodiment of the invention having a design as shown in FIGURE 1.

A linearly polarized wave passing through the wave guide 4 will be subjected to a phase shift therein, said phase shift being different at different wave frequencies. In FIGURE 2b, this difference in phase shift at the upper and lower frequency limits of the 200 megacycle wide range is represented by $\delta\uparrow$ and $\delta_1$, which are the incremental phase shifts of the vertically and the horizontally polarized components, respectively, in any wave transmission element. If L is the length of wave guide 4, $\Lambda_1$ the wave length in this wave guide of a horizontally polarized component at the lower limit frequency (2,700 megacycles/second), and $\Lambda_2$ is the corresponding wave length at the upper limit frequency (2,900 megacycles/second), then $\overset{\rightarrow}{\delta}$ for this wave guide can be calculated according to the following formula:

(1) $\quad \overset{\rightarrow}{\delta} = 360\left(\dfrac{L}{\overset{\rightarrow}{\Lambda_1}} - \dfrac{L}{\overset{\rightarrow}{\Lambda_2}}\right)$ (in degrees)

If $\Lambda_1\uparrow$ and $\Lambda_2\uparrow$ are the wave length at the upper and lower limit frequencies in the wave guide 4, taken for the vertically polarized component, $\delta\uparrow$ can be calculated from the following formula:

(2) $\quad \delta\uparrow = 360\left(\dfrac{L}{\Lambda_1\uparrow} - \dfrac{L}{\Lambda_2\uparrow}\right)$ (in degrees)

Furthermore, if $\overset{\rightarrow}{a}$ is the effective height of the wave guide cross section for the horizontally polarized component, the wave length of this component in the wave guide is given by:

(3) $\quad \overset{\rightarrow}{\Lambda} = \dfrac{\lambda}{\sqrt{1+\left(\dfrac{\lambda}{2\overset{\rightarrow}{a}}\right)^2}}$ where $\lambda$ is the corresponding wave length in air of the horizontally polarized $H_{10}$.

The corresponding formula for the vertically polarized component is given by:

(4) $\quad \Lambda\uparrow = \dfrac{\lambda}{\sqrt{1-\left(\dfrac{\lambda}{2a\uparrow}\right)^2}}$ where $a\uparrow$ is the effective height of the wave guide cross section for the vertically polarized component.

Equations (1) and (3) may be used to calculate $\underline{a}$, as follows:

(5) $\quad \overset{\rightarrow}{a} = \dfrac{\overset{\rightarrow}{\delta}}{360 \cdot L \cdot \sqrt{\dfrac{4}{\lambda_1^2 \lambda_2^2} - \left[\left(\dfrac{\overset{\rightarrow}{\delta}}{360-L}\right)^2 - \dfrac{1}{\lambda_1^2} - \dfrac{1}{\lambda_2^2}\right]^2}}$ As stated above, the subscripts 1 and 2 denote the upper and lower limits of the frequency range, illustrated in FIGURES 2a to 2c, i.e., subscript 1 refers to 2,700 megacycles/second, and subscript 2 refers to 2,900 megacycles/second. In Equation 5, all elements on the right-hand side are known, or they can be selected arbitrarily, or they can be computed from Equation 2 if it is assumed that each determining factor for the vertically polarized component is already fixed. Here, it should be noted that by "arbitrary" selection, a selection arbitrary only with respect to the matter at hand is meant, as these components may be determined by other factors not of interest here. The length L, for example, cannot be selected completely arbitrarily, because this length L is limited by the structurally determined and critical distance between radar reflector 1 and the exciter antenna horn 2.

The following is the data for an actual embodiment of the present invention. The length L of wave guide 4 was selected to be 69 cm. which was the maximum permissible length for the particular reflector 1. The wave guide 4 has a rectangular cross section, as stated above. The width was selected arbitrarily to be 7.2 cm. and this determined the wave length of the vertically polarized component. The incremental phase shift $\delta\uparrow$ can be calculated directly from Equation 2:

$$\delta\uparrow = 360\left(\dfrac{69}{14.85} - \dfrac{69}{17.41}\right) = 245°$$

This value is assumed in FIGURE 2b. As stated above, in this example, incremental differences $\delta\uparrow$ and $\overset{\rightarrow}{\delta}$ of the two circularly polarized components for the range as given (2,700 to 2,900 megacycles/second) and as produced by elements 2 and 5 differ by 70° after the waves have passed through these elements 5 and 2. This was the initial proposition and presented the problem of frequency-dependent phase shift to be solved, because this frequency-dependent phase shift distorts the polarization. Thus, the wave guide 4 inserted according to the invention has to balance this 70° difference. If, at the given width and length of wave guide 4, the $\delta\uparrow$ produced by it is 245°, $\overset{\rightarrow}{\delta}$ of wave guide 4 will have to be 245+70=315 in order to have, finally, the same increments $\delta\uparrow$ and $\overset{\rightarrow}{\delta}$ at the aperture of horn 2, these last increments now being considered for elements 4, 5 and 2 together.

In other words, the incremental increases $\delta$ of the phase shift over the frequency range of 2,700 to 2,900 megacycles/second, as produced by all elements of 4, 5 and 2 together, have to be equal at the aperture of horn 2, but they are acted upon, to a different degree, by elements 5 and 2. With some of the dimensions for wave guide 4 being given, the particular incremental increase in phase shift, as produced only by the wave guide 4 for the vertically polarized wave, is also given and the remaining dimensions of the wave guide 4 have to be selected so as to produce such an incremental phase shift of the horizontally polarized component, in order that the differences of the incremental phase shifts of the two components, as produced by elements 5 and 2 only, are balanced. This remaining dimension of wave guide 4 is the other width $\overset{\rightarrow}{a}$ thereof, to be determined by Equation 5. The incremental phase shift for the horizontally polarized component to be produced by wave guide 4 alone has to be 315° which is $\underset{\rightarrow}{\delta}$. With the limit frequencies 2,700 and 2,900 megacycles/second, the wave length is $\lambda_1=10.34$ cm., and the wave length $\lambda_2=11.1$ cm. With these values, Equation 5 shows that $\underset{\rightarrow}{a}=6.292$ cm. Thus, in this particular example, the wave guide to be inserted has a length of 69 cm. and a rectangular cross section of 7.2 cm. by 6.292 cm.

It will be appreciated that $\underset{\rightarrow}{a}$ could have been given, and that $a\uparrow$ could have been calculated by a corresponding formula.

Figure 3:
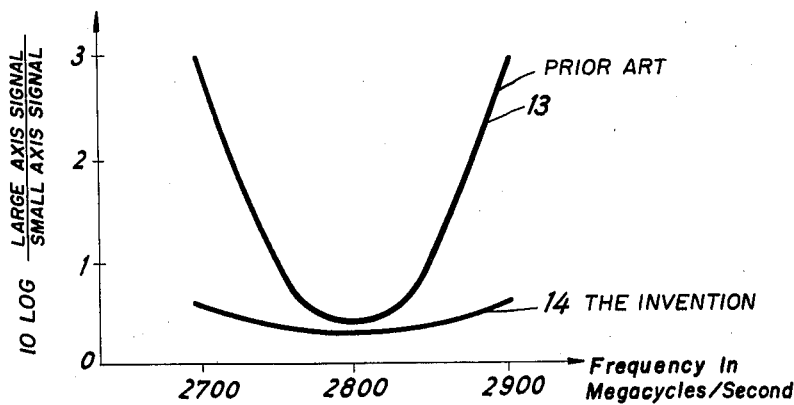
FIGURE 3 is a graph illustrating the effect produced by the invention in comparison with the effect of the unimproved prior art.

The improvement of a radar antenna radiator using the principle of the invention is demonstrated in FIGURE 3. The graph shown has as abscissa the operating frequency range chosen in the above described example, i.e., 2,700 to 2,900 megacycles/second. The ordinate represents db values of the signals; they indicate the ratio of the large axis to the small axis of an elliptically polarized wave, as it appears at the output of the transmission system (horn 2), and a part thereof being described in connection with FIGURE 1, in case a circularly polarized wave has been fed to its input (output of element 3).

The curve 13 represents the behavior of the transmission system if the system were to comprise only elements 5 and 2 of FIGURE 1. Therefore, this curve 13 can be considered as representing the ellipticity produced by these elements. With a minimum at the center of the frequency range, the db value goes up to 3 at the limit frequencies. If, however, the transmission system includes also the balancing element 4 and a circularly polarized wave is fed to the input of such element (output of polarization changer 3), then only an ellipticity with a ratio of the axes of 1:1.07 is produced. The db values for this case are also plotted in FIGURE 3 and are denoted by curve 14 which covers a range of only 0.3 to 0.6 db. It will be noted that this ellipticity differs very slightly from a circularly polarized wave.

It will be understood that the above description of the present invention is susceptible to various modifications, changes and adaptations, and the same are intended to be comprehended within the meaning and range of equivalents of the appended claims.

I claim:
1. In a radar antenna system, the combination which comprises: a polarization changer producing rotationally polarized waves having two linearly polarized components oscillating in directions perpendicular to each other, an antenna horn for radiating said waves against a reflector antenna; a wave guide direction changer connected to said horn; and a wave guide interconnecting said polarization changer and said direction changer, said wave guide including a phase shifter and having a length and cross section for balancing the frequency dependency of the difference in phase shift between said components as produced by said horn and said direction changer.

2. The combination as defined in claim 1 wherein said polarization changer, said horn, said wave guide and said wave direction changer are mounted for rotation about an axis, said polarization changer being positioned in the immediate vicinity of the axis of rotation.

References Cited by the Examiner

UNITED STATES PATENTS

| | | | |
|---|---|---|---|
| 2,425,345 | 8/1947 | Ring | 343—756 |
| 2,438,119 | 5/1948 | Fox | 333—31 |
| 2,493,842 | 1/1950 | Tyrrell | 343—762 |
| 2,546,840 | 3/1951 | Tyrrell | 333—31 |
| 2,599,753 | 6/1952 | Fox | 333—21 |
| 2,607,849 | 8/1952 | Purcell et al. | 250—13 |
| 2,858,512 | 10/1958 | Barnett | 333—31 |
| 2,858,535 | 10/1958 | Crandell et al. | 343—786 |
| 2,881,432 | 4/1959 | Hatkin | 343—756 |
| 2,930,040 | 3/1960 | Weil | 343—756 |
| 2,933,731 | 4/1960 | Foster | 343—756 |
| 2,952,017 | 9/1960 | Easy | 343—756 |
| 3,025,513 | 3/1962 | Easy | 343—5 |
| 3,031,661 | 4/1962 | Moeller | 343—756 |
| 3,076,188 | 1/1963 | Schneider | 343—756 |

HERMAN KARL SAALBACH, *Primary Examiner.*

CHESTER L. JUSTUS, *Examiner.*